(12) United States Patent
Haverkamp et al.

(10) Patent No.: US 10,926,587 B2
(45) Date of Patent: Feb. 23, 2021

(54) TIRE PRESSURE CONTROL SYSTEM

(71) Applicant: WABCO GmbH, Hannover (DE)

(72) Inventors: Michael Haverkamp, Hannover (DE); Dennis Sabelhaus, Hannover (DE); Thomas Stellmacher, Stadthagen (DE)

(73) Assignee: WABCO GMBH, Hannover (DE)

( * ) Notice: Subject to any disclaimer, the term of this patent is extended or adjusted under 35 U.S.C. 154(b) by 490 days.

(21) Appl. No.: 15/884,323

(22) Filed: Jan. 30, 2018

(65) Prior Publication Data

US 2018/0215210 A1    Aug. 2, 2018

(30) Foreign Application Priority Data

Jan. 31, 2017 (DE) .................... 10 2017 000 842.6

(51) Int. Cl.
*B60C 23/00* (2006.01)
*G05D 16/20* (2006.01)

(52) U.S. Cl.
CPC ...... *B60C 23/003* (2013.01); *B60C 23/00309* (2020.05); *B60C 23/00372* (2020.05); *G05D 16/2013* (2013.01)

(58) Field of Classification Search
CPC . B60C 23/003; B60C 23/10; B60C 23/00309; B60C 23/00372
See application file for complete search history.

(56) References Cited

U.S. PATENT DOCUMENTS

| | | | | |
|---|---|---|---|---|
| 6,098,682 A * | 8/2000 | Kis | .................... | B60C 23/003 137/224 |
| 7,963,307 B2 * | 6/2011 | Rudolf | .................. | B60C 23/003 152/416 |
| 8,136,561 B2 * | 3/2012 | Sandoni | ................ | B60C 23/003 152/415 |
| 10,377,188 B2 * | 8/2019 | Couppee | ................ | B60C 23/003 |
| 2008/0251177 A1 | 10/2008 | Sandoni et al. | | |
| 2010/0024939 A1 * | 2/2010 | Kusunoki | ........... | B60C 23/0408 152/416 |
| 2014/0034202 A1 * | 2/2014 | Voith | ...................... | B60C 29/06 152/415 |
| 2015/0360522 A1 * | 12/2015 | Dieckmann | ........... | B60C 23/003 152/417 |
| 2017/0361665 A1 | 12/2017 | Couppee et al. | | |

FOREIGN PATENT DOCUMENTS

DE    102015004366 A1    10/2016
EP       1931525 B1      6/2008

* cited by examiner

*Primary Examiner* — Scott A Browne
(74) *Attorney, Agent, or Firm* — Warner Norcross + Judd LLP (57) ABSTRACT

A tire pressure regulating system is disclosed for adjusting tire pressures of pneumatic tires of vehicle wheels of a plurality of vehicle axles of a motor vehicle while driving. The tire pressure regulating system comprises: at least one switchover valve, an axle valve, a wheel valve and a valve. A motor vehicle comprising the tire pressure regulating system is also disclosed.

11 Claims, 4 Drawing Sheets

TIRE PRESSURE CONTROL SYSTEM

CROSS-REFERENCE TO RELATED APPLICATIONS

This application claims priority to and all advantages of German Patent Application No. 10 2017 000 842.6, filed on 31 Jan. 2017, the content of which is hereby incorporated by reference.

FIELD OF THE INVENTION

The invention relates to a tire pressure regulating system via which tire pressures of pneumatic tires of vehicle wheels of a plurality of vehicle axles of a motor vehicle can be adjusted during driving, and to a motor vehicle including the tire pressure regulating system.

BACKGROUND OF THE INVENTION

Self-driving working machines, such as agricultural tractors and harvesting machines, which are intended for off-road use and have to cover relatively long distances at relatively high speed on public roads on the way to and from the locations of use, are expediently provided with a tire pressure regulating system via which tire pressures of pneumatic tires of the vehicle wheels can be adjusted, i.e., increased or decreased as required. While driving on paved roads requires a small contact area of the vehicle tires, which is achieved via an increased tire pressure, to achieve a low rolling resistance and good adhesion of the vehicle tires on the roadway, a tire pressure which is as low as possible is advantageous for off-road use, for example when working in a field or when harvesting wood in a forest. Owing to this low tire pressure, the vehicle wheels, on account of the increased contact area thereof, are prevented from sinking into the soft ground and also undesired compaction of the ground is prevented and the traction of the vehicle wheels is increased.

Since separate compressed air sources with an adequate compressed air supply are generally unavailable, either in stationary or mobile form, modern off-road working machines are increasingly being provided with a tire pressure regulating system which, in order to avoid long interruptions in driving or work, are typically designed in such a way that the tire pressures of the vehicle wheels can be adjusted during driving. Modern agricultural tractors, in particular, are often equipped with a compressed air brake system, so that, in this case, the tire pressure regulating system can advantageously use the existing compressed air supply system of the brake system as a compressed air source.

EP 1 931 525 B1 describes a tire pressure regulating system of a two-axle motor vehicle, in which tire pressure regulating system two axle connecting lines is alternately connectable to an outlet line or to a filling pressure line, which is connected to a compressed air source, via an electromagnetically switchable switchover valve in each case. The outlet line is alternately connectable to a return line, which is connected to the compressed air source via a non-return valve, or to a venting line, which leads to the surrounding area via a sound suppressor, via a further electromagnetically switchable switchover valve. The axle connecting lines each branch into two outer wheel connecting lines which are guided to a pneumatically switchable wheel valve of the associated vehicle wheel via a pneumatic rotary coupling in each case. Inner wheel connecting lines, which each lead into the interior of the relevant wheel tire, is alternately connectable to the associated outer wheel connecting line or shut off with respect to the associated outer wheel connecting line via the wheel valves. An electromagnetically switchable pilot control valve is associated with each wheel valve, by which a wheel control line of the associated vehicle wheel is alternately connectable to a venting line, which leads into the surrounding area via a sound suppressor, or to a control pressure line, which is connected to the filling pressure line. The wheel control lines are guided to the control inputs of the associated wheel control valves via a pneumatic rotary coupling in each case.

DE 10 2015 004 366 A1 discloses a plurality of embodiments of a tire pressure regulating system of a two-axle motor vehicle, in which two main connecting lines is alternately connectable to a venting line, which leads to the surrounding area via a sound suppressor, or to a filling pressure line, which is connected to a compressed air source via a pressure limiting valve, via at least one electromagnetically switchable switchover valve. An axle connecting line is associated with each vehicle axle, which axle connecting line can be connected to the associated main connecting line or shut off with respect to the associated main connecting line via an electromagnetically switchable axle valve. Each axle connecting line branches into two outer wheel connecting lines which are guided to a hydraulically switchable wheel valve of the associated vehicle wheel via a pneumatic connecting channel of a two-channel rotary coupling in each case. Inner wheel connecting lines, which each lead into the interior of the relevant wheel tire, is alternately connectable to the associated outer wheel connecting line or shut off with respect to the associated outer wheel connecting line via the wheel valves. A common electromagnetically switchable pilot control valve is associated with the wheel valves is alternately connectable.

For tire pressure regulating systems, control valves are electrically driven by an electronic control unit (ECU), either directly or indirectly via a pilot control valve. Accordingly, the safety requirements made of the electronics system of the electrical control unit in accordance with standard ISO 25119 are correspondingly high, in order to ensure the functional reliability of the respective tire pressure regulating system, in particular in order to avoid a malfunction in one of the control valves on account of an electronic defect in the electronic control unit.

SUMMARY OF THE INVENTION

The present invention provides a tire pressure regulating system of a motor vehicle fitted with pneumatic tires.

The tire pressure regulating device by which tire pressures of the pneumatic tires of vehicle wheels of a plurality of vehicle axles of the motor vehicle can be adjusted during driving comprises:

at least one electromagnetically switchable switchover valve by which at least one main connecting line, which leads to an axle valve of a vehicle axle, is alternately connectable to a venting line which leads into the surrounding area or to a filling pressure line which is connected via a pressure limiting valve to a compressed air source, an electromagnetically switchable axle valve associated with each of the vehicle axles and by which in each case an axle connecting line branching into outer wheel connecting lines of the relevant vehicle axle is alternately connectable to the associated main connecting line or shut off with respect to the associated main connecting line, a wheel valve which arranged on each vehicle wheel by which an inner wheel connecting line which leads into the interior of the relevant wheel tire is alternately connectable to the associated outer wheel connecting line or shut off with respect to the associated outer wheel connecting line, two-channel rotary couplings arranged between the vehicle axles and the associated vehicle wheels, each of the two-channel rotary couplings having a working connection for transmitting compressed air between the vehicle chassis-side sections and the wheel-side sections of the outer wheel connecting lines and also having a control connection for transmitting control signals to the wheel valves between vehicle chassis-side sections and wheel-side sections of associated wheel control lines, and a valve arrangement by which a complete pressure drop in the air pressure in the wheel tires of the vehicle wheels via the switchover valve, the axle valves and the wheel valves can be automatically prevented.

In the unoperated, i.e., zero-current, inoperative position of the at least one switchover valve, the connected main connecting lines are usually connected to the typically unpressurized venting line which leads into the surrounding area, and therefore the tire pressure of the vehicle wheels can then be reduced. In the operated, i.e., energized, switching position of the switchover valve, the connected main connecting lines are connected to the pressure-carrying filling pressure line which is connected to the compressed air source, as a result of which the tire pressure of the vehicle wheels can be increased.

It is also desirable to open the axle valves and the wheel valves in order to fill and deflate the wheel tires. For this purpose, the axle valves of those vehicle axles, the wheel tires of which are to be filled or deflated, are opened by operating, i.e., energizing, the relevant axle valves and thereby connecting the relevant axle connecting lines to the main connecting line. The axle valves of those vehicle axles in the case of which the tire pressures are intended to remain unchanged remain in their unoperated, i.e., zero-current, inoperative position, in which the relevant axle connecting lines are shut off with respect to the main connecting line. By virtue of operating the wheel valves, accordingly switching over the wheel valves to the open switching position, the inner wheel connecting lines are connected to the outer wheel connecting lines, as a result of which the wheel tires of the vehicle wheels of those vehicle axles of which the axle control valve is open are filled or deflated depending on the switching position of the switchover valve.

After filling or deflation of the wheel tires, the wheel valves are switched over to their closed inoperative position. After increasing the tire pressure, the main connecting lines which run from the at least one switchover valve to the wheel valves are initially vented by switching over the switchover valve to its inoperative position, before the axle valves are closed. After reducing the tire pressure, the axle valves can conversely be immediately closed. Owing to the pressure release in the wheel control lines and the outer wheel connecting lines outside actuating processes, permanent pressing of the typically inflatable seals against the associated sealing faces in the rotary couplings is avoided and therefore wear of these seals is greatly reduced.

The separate construction of the connecting and control line paths and the splitting of the switchover and shut-off functions in the connecting lines into separate control valves already mean that the tire pressure regulating system according to the invention has improved controllability in combination with a high level of functional reliability.

Since the at least one switchover valve, the axle valves, directly, and the wheel valves, at least indirectly, are electrically driven by an electronic control unit, a defect in the electronic control unit can lead to undesired switching over of at least one axle valve and also of the wheel valves and therefore to complete pressure loss in the wheel tires of the vehicle wheels of at least one vehicle axle if further precautions are not taken. In order to prevent this, a valve arrangement is provided according to the invention, by which a complete pressure drop in the air pressure in the wheel tires of the vehicle wheels via the switchover valve, the axle valves and the wheel valves is automatically prevented. If a defect now occurs in the electronic control unit, which defect leads to undesired switching over of at least one axle valve and of the wheel valves, the air pressure in the affected wheel tire can drop at most down to a prespecified minimum pressure. As a result, the functional reliability of the compressed air supply system according to the invention is considerably increased, and the safety requirements made of the electronic control unit in accordance with standard ISO 25119 are accordingly lower, which is advantages in respect of costs.

In certain embodiments, the valve arrangement comprises a pressure maintaining valve which is arranged in each of the axle connecting lines and by which air pressure in the respective axle-side section of the relevant axle connecting line and therefore also in the connected outer and inner wheel connecting lines is automatically maintained at a predetermined minimum pressure. A pressure maintaining valve is a shut-off valve which automatically closes when a set minimum pressure at the inner connection is reached or undershot.

Alternatively, in other embodiments, the valve arrangement can comprise a single pressure maintaining valve which is arranged in the venting line and by which air pressure in the inner section of the venting line and therefore also in the connected main connecting lines, axle connecting lines and also outer and inner wheel connecting lines is automatically maintained at a predetermined minimum pressure.

In various embodiments, the wheel valves are in the form of pneumatically switchable 2/2-way switching valves, a pneumatic wheel control line being associated with each wheel valve, which pneumatic wheel control line is guided to a vehicle chassis-side pneumatic main control line via a pneumatic control connection in the respective rotary coupling, which main control line is alternately connectable to a venting output or to the filling pressure line via an electromagnetically switchable pilot control valve which is in the form of a 3/2-way switching valve.

Alternatively, however, in other embodiments the wheel valves are in the form of electromagnetically switchable 2/2-way switching valves, and for an electrical wheel control line to be associated with each wheel valve, which electrical wheel control line is connected to the electronic control unit via an electrical control connection in the respective rotary coupling.

In embodiments when the supply line of a secondary consumer circuit serves as the compressed air source, the filling pressure line is typically connected to the compressed air source via an overflow valve by which the filling pressure line can be shut off in the event of pressure loss in one of the axle or wheel connecting lines or in one of the wheel tires of the vehicle wheels. Therefore, compressed air advantageously continues to be supplied to the relevant secondary consumer circuit in the event of defect-related pressure loss in the tire pressure regulating system.

In certain embodiments, in order to reduce the expenditure on manufacturing and assembly and also in order to provide protection against dirt, water and external damage, it is advantageous when the pressure limiting valve, the at least one switchover valve, the axle valves and the pressure maintaining valves or the only one pressure maintaining valve and also, if present, the pilot control valve and the overflow valve are physically combined in a central valve which can be preassembled.

BRIEF DESCRIPTION OF THE DRAWING

The invention is described in greater detail below with reference to the accompanying figures, in which.

DETAILED DESCRIPTION

Figure 1:
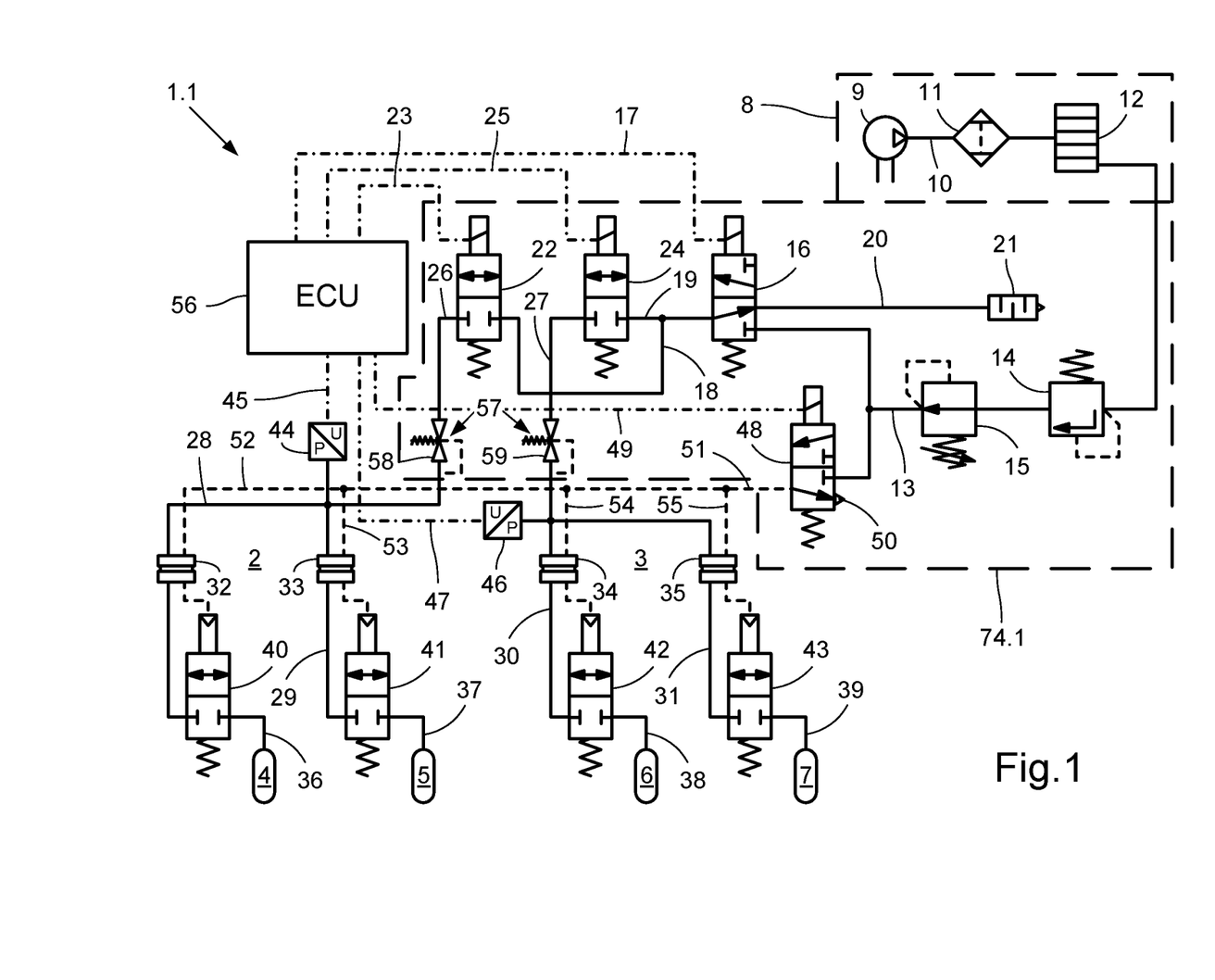
FIG. 1 shows a schematic view of a first embodiment of a tire pressure regulating system according to the invention.

With reference to the specific embodiment of the Figures, wherein like numerals generally indicate like parts throughout the several views, FIG. 1 depicts a first embodiment of a tire pressure regulating system 1.1 according to the invention of a motor vehicle having, by way of example, two vehicle axles 2, 3, each with two vehicle wheels 4, 5; 6, 7.

The tire pressure regulating system 1.1 has a switchover valve 16, two axle valves 22, 24 and also a pilot control valve 48 which can be arranged, for example, on a vehicle chassis of the motor vehicle. Furthermore, the tire pressure regulating system 1.1 has four wheel valves 40, 41, 42, 43 which are each arranged on one of the vehicle wheels 4, 5, 6, 7, not illustrated in any detail, of the vehicle axles 2, 3. In this embodiment, the switchover valve 16 and the pilot control valve 48 are in the form of electromagnetically switchable 3/2-way switching valves and the two axle valves 22, 24 are in the form of electromagnetically switchable 2/2-way switching valves. The axle valves 22, 24 are each associated with a vehicle axle 2, 3. In certain embodiments, the first axle valve 22 is associated with the front axle 2, whereas the second axle valve 24 is associated with the rear axle 3. The control valves 16, 22, 24, 48, which are arranged on the vehicle chassis, are connected for control purposes to an electronic control unit 56 via electrical control lines 17, 23, 25, 49. The wheel valves 40, 41, 42, 43 which are arranged on the vehicle wheels 4, 5, 6, 7 may be in the form of pneumatically switchable 2/2-way switching valves.

A main connecting line 18, 19, which leads to each of the two axle valves 22, 24, in each case is alternately connectable to an unpressurized venting line 20, which leads to the surrounding area, or to a pressure-carrying filling pressure line 13, which is connected to a compressed air source 8 via the switchover valve 16. In the present case, the filling pressure line 13 is connected to the compressed air source 8 via an overflow valve 14 and a pressure limiting valve 15, which compressed air source may be, by way of example, in the form of a compressed air supply system of a compressed air brake system, not illustrated in any detail, of the motor vehicle. The compressed air brake system 8 comprises a compressor 9 which is connected to an input connection of a multiple-circuit protective valve 12 via a delivery pressure line 10 which is provided with a dryer unit 11.

The filling pressure line 13 can be connected to an output connection of the multiple-circuit protective valve 12 either alone or via the supply line of a secondary consumer circuit. In the case of sole connection of the filling pressure line 13 to an output connection of the multiple-circuit protective valve 12, the overflow valve 14 is superfluous since the remaining consumer circuits are then protected with respect to the tire pressure regulating system 1.1 by the associated overflow valve within the multiple-circuit protective valve 12. In contrast, when the filling pressure line 13 is connected to the supply line of a secondary consumer circuit, the overflow valve 14 which is present in FIG. 1 may be advantageously included for protecting the relevant secondary consumer circuit against pressure loss within the tire pressure regulating system 1.1.

In the unoperated, i.e., deenergized, state of the switchover valve 16, in which the switchover valve is in its inoperative position, the two main connecting lines 18, 19 are connected to the venting line 20 which leads into the surrounding area via a sound suppressor 21. In the operated, i.e., energized, state of the switchover valve 16, in which the switchover valve assumes its switching position, the two main connecting lines 18, 19 are connected to the filling pressure line 13.

An axle connecting line 26, 27, which in each case branches into two outer wheel connecting lines 28, 29; 30, 31 on the associated vehicle axles 2, 3, in each case is alternately connectable to the associated main connecting line 18, 19 or shut off with respect to the associated main connecting line via the two axle valves 22, 24. In the unoperated, i.e., deenergized, state of the two axle valves 22, 24, in which the axle valves are in their inoperative position, the respective axle connecting line 26, 27 is shut off with respect to the associated main connecting line 18, 19. In the operated, i.e., energized, state of the axle valves 22, 24, in which the axle valves assume their switching position, the respective axle connecting line 26, 27 is connected to the associated main connecting line 18, 19.

A pressure maintaining valve 58, 59 is arranged in the two axle connecting lines 26, 27 in each case as components of a valve arrangement 57 for increasing the functional reliability, the air pressure in the respective axle-side section of the relevant axle connecting line 26, 27 being automatically maintained at a predetermined minimum pressure via the pressure maintaining valves. A pressure sensor 44, 46 is connected to the axle-side section of the axle connecting lines 26, 27 in each case, the pressure sensors being connected to the electronic control unit 56 via electrical sensor lines 45, 47.

The outer wheel connecting lines 28, 29, 30, 31 are guided from the two vehicle axles 2, 3 to the wheel valves 40, 41, 42, 43, which are arranged on the vehicle wheels 4, 5, 6, 7, via in each case a two-channel rotary coupling 32, 33, 34, 35 which is typically provided with inflatable seals. An inner wheel connecting line 36, 37, 38, 39, which leads into the interior of the relevant wheel tire, not illustrated in any detail here, in each case is alternately connectable to the associated outer wheel connecting line 28, 29, 30, 31 or shut off with respect to the associated outer wheel connecting line via the wheel valves 40, 41, 42, 43. In the unoperated state of the wheel valves 40, 41, 42, 43, i.e., in the state in which they are free of control pressure, in which the wheel valves are in their inoperative position, the respective inner wheel connecting line 36, 37, 38, 39 is shut off with respect to the associated outer wheel connecting line 28, 29, 30, 31. In the operated state, i.e., the state in which control pressure is applied, of the wheel valves 40, 41, 42, 43 in which the wheel valves assume their switching position, the respective inner wheel connecting line 36, 37, 38, 39 is connected to the associated outer wheel connecting line 28, 29, 30, 31.

In certain embodiments, the wheel valves 40, 41, 42, 43 are operated via the pilot control valve 48 by it being possible for a pneumatic main control line 51, to which pneumatic wheel control lines 52, 53, 54, 55, which lead to the control inputs of the wheel valves 40, 41, 42, 43, are connected via a pneumatic control connection in each case in the rotary couplings 32, 33, 34, 35, to be alternately connected to a venting output 50 or to the filling pressure line 13.

In the unoperated, i.e., deenergized, state of the pilot control valve 48 in which the pilot control valve is in its inoperative position, the main control line 51 is connected to the venting output 50 and is therefore unpressurized. In the operated, i.e., energized, state of the pilot control valve 48 in which the pilot control valve assumes its switching position, the main control line 51 is connected to the filling pressure line 13 and therefore carries pressure. In specific embodiments, the overflow valve 14, the pressure limiting valve 15, the switchover valve 16, the two axle valves 22, 24, the pilot control valve 48 and the two pressure maintaining valves 58, 59 are combined in a central valve 74.1 which can be preassembled.

In order to fill the wheel tires of the vehicle wheels 4, 5, 6, 7, the switchover valve 16 is switched to its switching position in which the main connecting lines 18, 19 are connected to the filling pressure line 13. In order to empty the wheel tires of the vehicle wheels 4, 5, 6, 7, the switchover valve 16 remains in its inoperative position in which the two main connecting lines 18, 19 are connected to the venting line 20. The axle valves 22, 24 of those vehicle axles 2, 3 of which the wheel tires are intended to be filled or deflated are then opened by operating, i.e., energizing, the relevant axle valves 22, 24 and therefore the relevant axle connecting lines 26, 27 are connected to the associated main connecting lines 18, 19. The axle valves 22, 24 of those vehicle axles 2, 3 in which the tire pressures are intended to remain unchanged remain in their unoperated, i.e., zero-current, inoperative position in which the relevant axle connecting lines 26, 27 are shut off with respect to the associated main connecting lines 18, 19. In addition, all of the wheel valves 40, 41, 42, 43 are opened for filling and deflating the wheel tires. This is performed by operating, i.e., energizing, the pilot control valve 48, as a result of which the pneumatic main control line 51 is connected to the filling pressure line 13 and the air pressure prevailing in the filling pressure line 13 is passed to the control inputs of the wheel valves 40, 41, 42, 43 via the pneumatic main control line 51 and the wheel control lines 52, 53, 54, 55 and also the rotary couplings 32, 33, 34, 35 as control pressure. Owing to the application of the control pressure, the wheel valves 40, 41, 42, 43 are switched over from their closed inoperative position to their open switching position, and therefore a continuous connection is established between the interiors of the wheel tires of the two vehicle axles 2, 3 and, depending on the switching position of the switchover valve 16, to the filling pressure line 13 or the venting line 20.

In certain embodiments when a common switchover valve 16 is associated with the two vehicle axles 2, 3, the tire pressure in the wheel tires of the front axle 2 and of the rear axle 3 can be raised or lowered only at the same time. If the tire pressure in the wheel tires of the front axle 2 and of the rear axle 3 are intended to be regulated independently, a separate switchover valve, which is connected upstream of the respective axle valve 22, 24, is utilized for each vehicle axle 2, 3.

The air pressure in the respective axle-side section of the relevant axle connecting line 26, 27 and therefore also in the connected outer and also inner wheel connecting lines 28, 29, 30, 31, 36, 37, 38, 39 is automatically maintained at a predetermined minimum pressure by the pressure maintaining valves 58, 59 in the two axle connecting lines 26, 27. As a result, complete pressure loss in the wheel tires of the vehicle wheels 4, 5, 6, 7 is not possible, this otherwise being possible owing to undesired switching over of at least one axle valve 22, 24 and of the pilot control valve 48 and, respectively, the wheel valves 40, 41, 42, 43 in a manner triggered by a possible electronic defect in the electronic control unit 56. The safety requirements made of the electronic control unit 56 in accordance with standard ISO 25119 are therefore accordingly lower, this being associated with advantages in respect of costs.

The tire pressure prevailing in the wheel tires of the two vehicle axles 2, 3 can be detected via the pressure sensors 44, 46 and monitored by the control unit 56, so that overfilling or underfilling of the wheel tires can be prevented. The tire pressure prevailing in the wheel tires can also be checked outside adjusting processes, for example while driving along a road or while working away from paved roads, via the pressure sensors 44, 46 by the wheel valves 40, 41, 42, 43 being briefly opened when the axle valves 22, 24 are closed and the pressures prevailing in the axle connecting lines 26, 27 then being detected.

Figure 2:
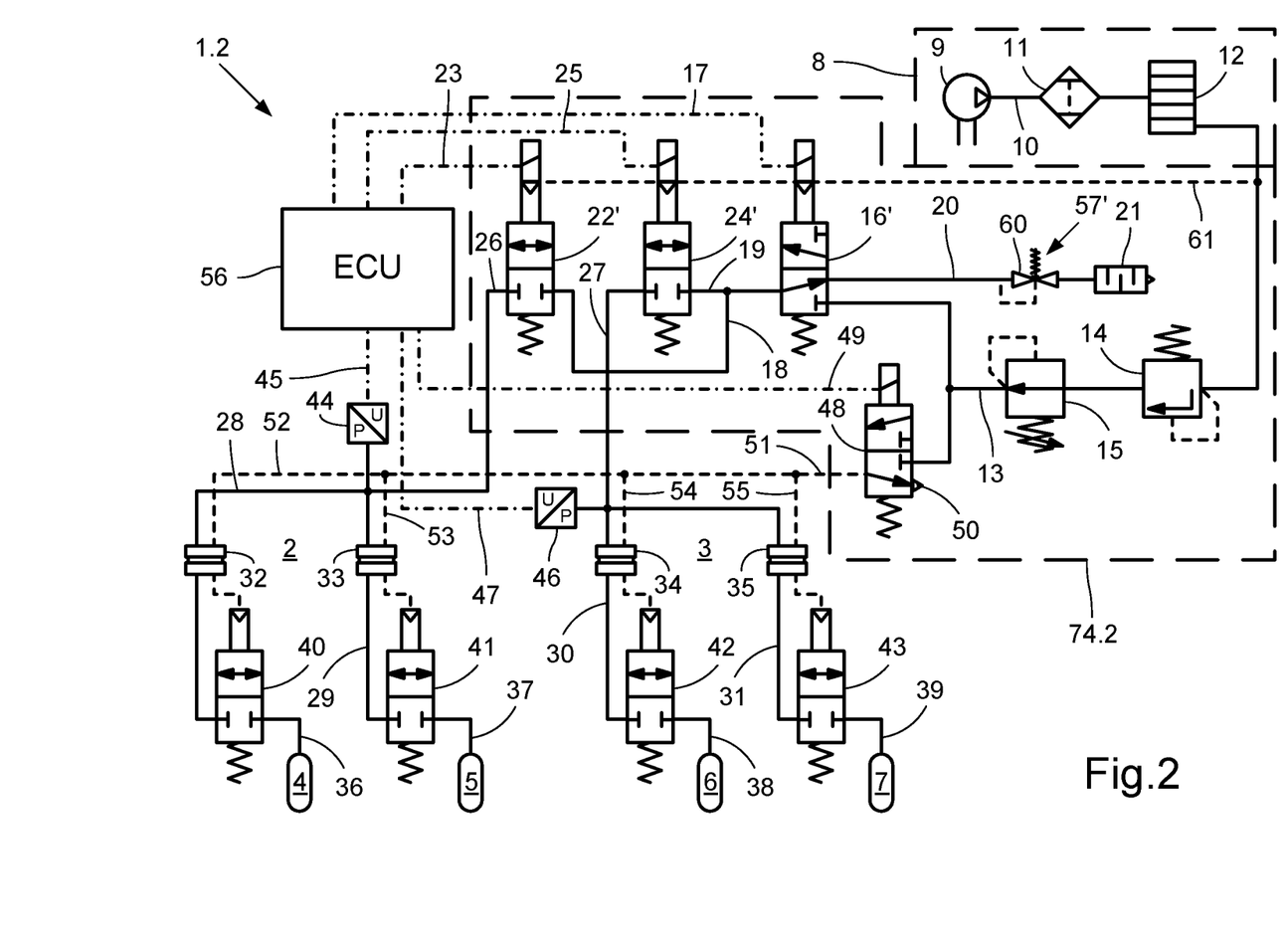
FIG. 2 shows a schematic view of a second embodiment of a tire pressure regulating system according to the invention.

In contrast to the first embodiment of the tire pressure regulating system 1.1 according to FIG. 1, a second embodiment of a tire pressure regulating system according to the invention, which second embodiment is depicted in the schematic overview of FIG. 2 and has a largely identical manner of operation, has a valve arrangement 57' for increasing the functional reliability using only one pressure maintaining valve 60. This single pressure maintaining valve 60 is arranged in the venting line 20, as a result of which the air pressure in the inner section of the venting line 20, the two main connecting lines 18, 19, the two axle connecting lines 26, 27 and also the outer and inner wheel connecting lines 28, 29, 30, 31, 36, 37, 38, 39 is automatically maintained at a predetermined minimum pressure. As a result, complete pressure loss in the wheel tires of the vehicle wheels 4, 5, 6, 7 is likewise not possible, this otherwise being possible owing to undesired switching over of at least one axle valve 22', 24' and of the pilot control valve 48 and, respectively, the wheel valves 40, 41, 42, 43.

In the exemplary embodiment according to FIG. 2, the switchover valve 16' and the two axle valves 22', 24' are, by way of example, in the form of electromagnetically/pneumatically switchable switching valves, the pneumatic control inputs of which are connected to the input-side section of the filling pressure line 13 via a common control pressure line 61. On account of the pneumatic assistance, only a relatively low control current is required for switching over the switchover valve 16' and the two axle valves 22', 24' in each case. In specific embodiments, the overflow valve 14, the pressure limiting valve 15, the switchover valve 16', the two axle valves 22', 24', the pilot control valve 48 and the pressure maintaining valve 60 are physically combined in a central valve 74.2 which can be preassembled.

Figure 3:
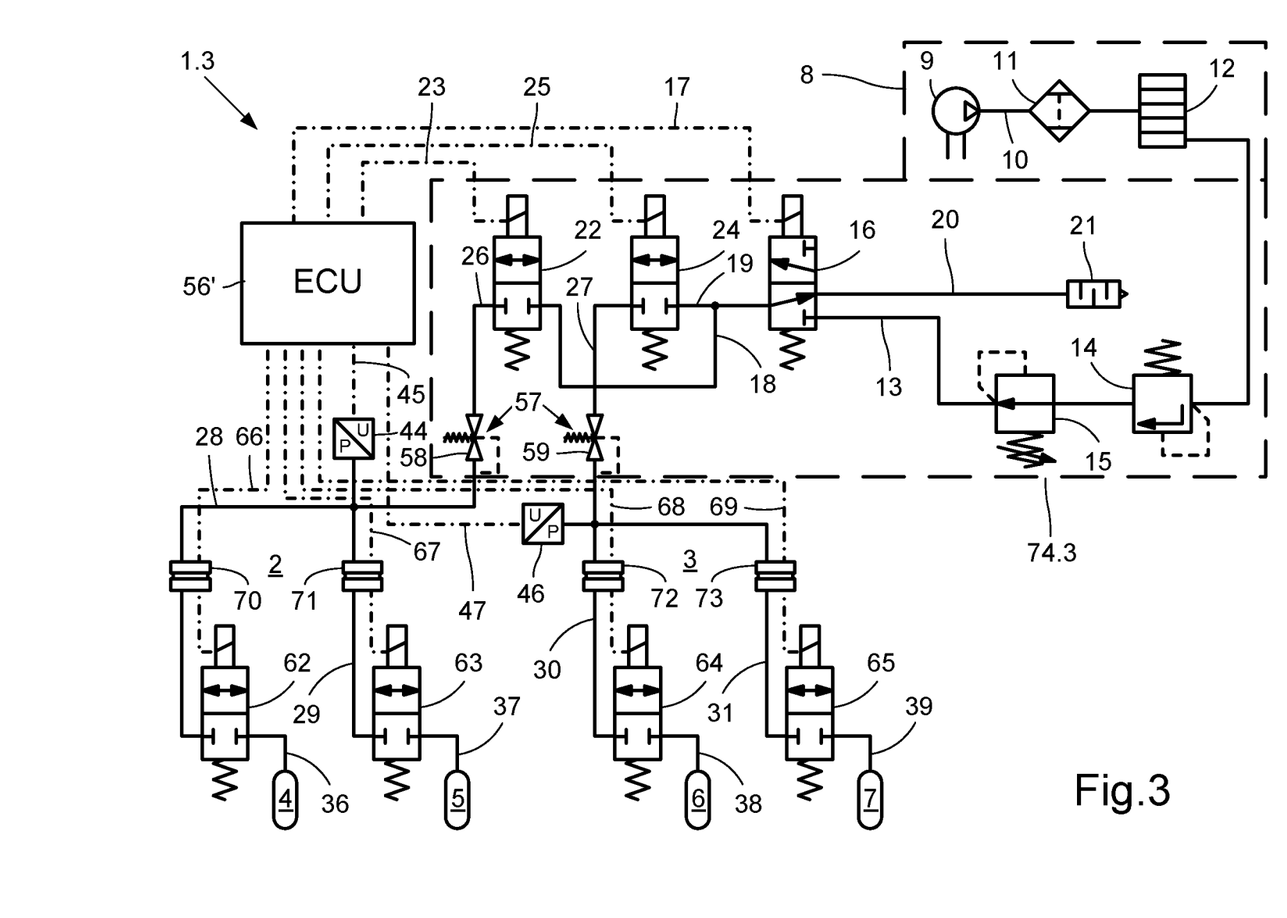
FIG. 3 shows a schematic view of a third embodiment of a tire pressure regulating system according to the invention.

A third embodiment of a tire pressure regulating system 1.3 having the features of the invention, which third embodiment is depicted in the schematic overview of FIG. 3, differs from the first embodiment of the tire pressure regulating system 1.1 according to FIG. 1 in that the wheel valves 62, 63, 64, 65 are in the form of a electromagnetically switchable 2/2-way switching valve. An electrical wheel control line 66, 67, 68, 69 is associated with each of these wheel valves 62, 63, 64, 65, the electrical wheel control lines being connected to the electronic control unit 56' via an electrical control connection in the respective rotary coupling 70, 71, 72, 73. The wheel valves 62, 63, 64, 65 are therefore driven directly by the control unit 56' and can be switched over independently of one another on account of the separate wheel control lines 66, 67, 68, 69. The further manner of operation of the third tire pressure regulating system 1.3 corresponds to that of the first tire pressure regulating system 1.1 according to FIG. 1. In specific embodiments, the overflow valve 14, the pressure limiting valve 15, the switchover valve 16, the two axle valves 22, 24 and the two pressure maintaining valves 58, 59 are combined in a central valve 74.3 which can be preassembled.

Figure 4:
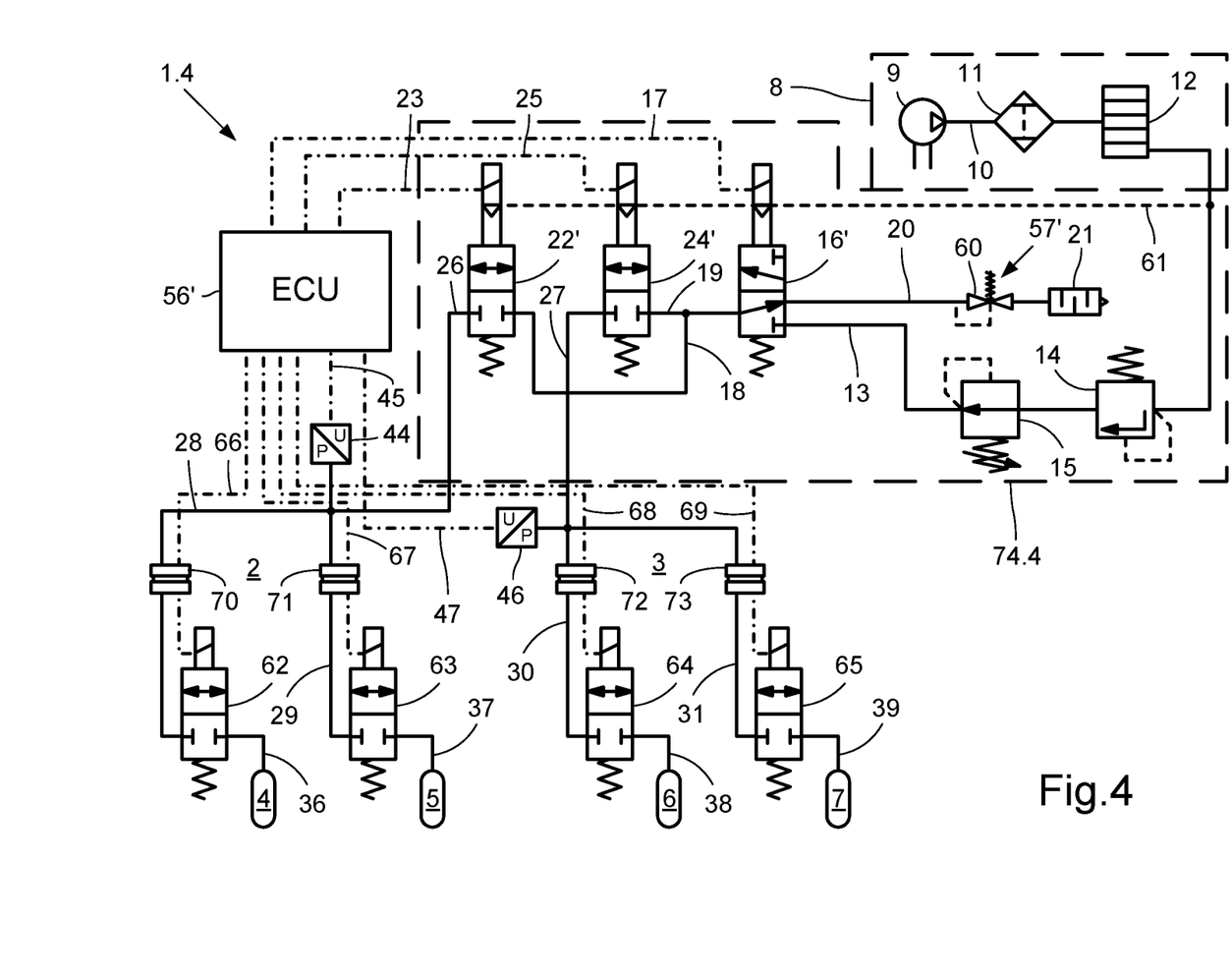
FIG. 4 shows a schematic view of a fourth embodiment of a tire pressure regulating system according to the invention.

A fourth embodiment of a tire pressure regulating system 1.4 which has the features of the invention, which fourth embodiment is depicted in FIG. 4, differs from the second tire pressure regulating system 1.2 according to FIG. 2 likewise in that the wheel valves 62, 63, 64, 65 are in the form of electromagnetically switchable 2/2-way switching valves as in the third tire pressure regulating system 1.3 according to FIG. 3. In this case too, an electrical wheel control line 66, 67, 68, 69 is associated with each wheel valve 62, 63, 64, 65, which electrical wheel control lines are connected to the electronic control unit 56' via an electrical control connection in the respective rotary coupling 70, 71, 72, 73. Therefore, the wheel valves 62, 63, 64, 65 are driven directly by the control unit 56' and can be switched over independently of one another on account of the separate wheel control lines 66, 67, 68, 69 here too. The further manner of operation of the fourth tire pressure regulating system 1.4 corresponds to that of the second tire pressure regulating system 1.2 according to FIG. 2. In specific embodiments, the overflow valve 14, the pressure limiting valve 15, the switchover valve 16', the two axle valves 22', 24' and the pressure maintaining valve 60 are physically combined in a central valve 74.4 which can be preassembled.

LIST OF REFERENCE SYMBOLS (PART OF THE DESCRIPTION)

1.1 Tire pressure regulating system (first embodiment)
1.2 Tire pressure regulating system (second embodiment)
1.3 Tire pressure regulating system (third embodiment)
1.4 Tire pressure regulating system (fourth embodiment)
2 Vehicle axle, front axle
3 Vehicle axle, rear axle
4 Vehicle wheel, left-hand-side front wheel
5 Vehicle wheel, right-hand-side front wheel
6 Vehicle wheel, left-hand-side rear wheel
7 Vehicle wheel, right-hand-side rear wheel
8 Compressed air source, compressed air supply system
9 Compressor
10 Delivery pressure line
11 Dryer unit
12 Multiple-circuit protective valve
13 Filling pressure line
14 Overflow valve
15 Pressure limiting valve
16, 16' Switchover valve
17 Electrical control line
18 First main connecting line
19 Second main connecting line
20 Venting line
21 Sound suppressor
22, 22' First axle valve
23 Electrical control line
24, 24' Second axle valve
25 Electrical control line
26 First axle connecting line
27 Second axle connecting line
28 First outer wheel connecting line
29 Second outer wheel connecting line
30 Third outer wheel connecting line
31 Fourth outer wheel connecting line
32 First rotary coupling
33 Second rotary coupling
34 Third rotary coupling
35 Fourth rotary coupling
36 First inner wheel connecting line
37 Second inner wheel connecting line
38 Third inner wheel connecting line
39 Fourth inner wheel connecting line
40 First wheel valve
41 Second wheel valve
42 Third wheel valve
43 Fourth wheel valve
44 Pressure sensor
45 Sensor line
46 Pressure sensor
47 Sensor line
48 Pilot control valve
49 Electrical control line
50 Venting output
51 Pneumatic main control line
52 First pneumatic wheel control line
53 Second pneumatic wheel control line
54 Third pneumatic wheel control line
55 Fourth pneumatic wheel control line
56, 56' Electrical control unit, ECU
57, 57' Valve arrangement
58 First pressure maintaining valve
59 Second pressure maintaining valve
60 Pressure maintaining valve
61 Control pressure line
62 First wheel valve
63 Second wheel valve
64 Third wheel valve
65 Fourth wheel valve
66 First electrical wheel control line
67 Second electrical wheel control line
68 Third electrical wheel control line
69 Fourth electrical wheel control line
70 First rotary coupling
71 Second rotary coupling
72 Third rotary coupling
73 Fourth rotary coupling
74.1 Central valve (first embodiment)
74.2 Central valve (second embodiment)
74.3 Central valve (third embodiment)
74.4 Central valve (fourth embodiment)

What is claimed is:

1. A tire pressure regulating system for adjusting tire pressures of pneumatic tires fitted to vehicle wheels of a plurality of vehicle axles of a motor vehicle, said tire pressure regulating system comprising:

at least one electromagnetically switchable switchover valve by which a main connecting line leading to an axle valve of a vehicle axle is alternately connectable to a venting line which leads into a surrounding area or to a filling pressure line which is connected via a pressure limiting valve to a compressed air source, wherein the axle valve is an electromagnetically switchable axle valve associated with the vehicle axle by which an axle connecting line branching into first and second outer wheel connecting lines of the vehicle axle is alternately connectable to the main connecting line or shut off with respect to the main connecting line, a wheel valve arranged on a vehicle wheel by which an inner wheel connecting line leading into an interior of a pneumatic tire of the vehicle wheel is alternately connectable to the first outer wheel connecting line or shut off with respect to the first outer wheel connecting line, a two-channel rotary coupling arranged between the vehicle axle and the vehicle wheel, the two-channel rotary coupling having a working connection for transmitting compressed air between a vehicle chassis-side section and a wheel-side section of the outer wheel connecting line, the two-channel rotary coupling also having a control connection for transmitting control signals to the wheel valve between a vehicle chassis-side section and a wheel-side section of a wheel control line, and a valve arrangement by which a complete pressure drop in air pressure in the pneumatic tire of the vehicle wheel via the switchover valve, the axle valve and the wheel valve can be automatically prevented, wherein the valve arrangement comprises a pressure maintaining valve arranged in the venting line by which air pressure in an inner section of the venting line is automatically maintained at a predetermined minimum pressure.

2. The tire pressure regulating system as claimed in claim 1, wherein the valve arrangement comprises a pressure maintaining valve arranged in the axle connecting line by which air pressure in an axle-side section of the axle connecting line is automatically maintained at the predetermined minimum pressure.

3. The tire pressure regulating system as claimed claim 1, wherein the wheel valve is in the form of a pneumatically switchable 2/2-way switching valve, wherein a pneumatic wheel control line is associated with the wheel valve, the pneumatic wheel control line being guided to a vehicle chassis-side pneumatic main control line via a pneumatic control connection in the rotary coupling, and wherein the main control line is alternatively connectable to a venting output or to the filling pressure line via an electromagnetically switchable pilot control valve which is in the form of a 3/2-way switching valve.

4. The tire pressure regulating system as claimed in claim 1, wherein the wheel valve is in the form of an electromagnetically switchable 2/2-way switching valves and wherein an electrical wheel control line is associated with the wheel valve, the electrical wheel control line being connected to an electronic control unit via an electrical control connection in the rotary coupling.

5. The tire pressure regulating system as claimed in claim 1, wherein the filling pressure line is connected to the compressed air source via an overflow valve by which the filling pressure line can be shut off in the event of pressure loss in the axle or wheel connecting line or in the pneumatic tire of the vehicle wheel.

6. A tire pressure regulating system for adjusting tire pressures of pneumatic tires fitted to vehicle wheels of a plurality of vehicle axles of a motor vehicle, said tire pressure regulating system comprising:

at least one electromagnetically switchable switchover valve by which a main connecting line leading to an axle valve of a vehicle axle is alternately connectable to a venting line which leads into a surrounding area or to a filling pressure line which is connected via a pressure limiting valve to a compressed air source, wherein the axle valve is an electromagnetically switchable axle valve associated with the vehicle axle by which an axle connecting line branching into first and second outer wheel connecting lines of the vehicle axle is alternately connectable to the main connecting line or shut off with respect to the main connecting line, a wheel valve arranged on a vehicle wheel by which an inner wheel connecting line leading into an interior of a pneumatic tire of the vehicle wheel is alternately connectable to the first outer wheel connecting line or shut off with respect to the first outer wheel connecting line, a two-channel rotary coupling arranged between the vehicle axle and the vehicle wheel, the two-channel rotary coupling having a working connection for transmitting compressed air between a vehicle chassis-side section and a wheel-side section of the outer wheel connecting line, the two-channel rotary coupling also having a control connection for transmitting control signals to the wheel valve between a vehicle chassis-side section and a wheel-side section of a wheel control line, and a valve arrangement by which a complete pressure drop in air pressure in the pneumatic tire of the vehicle wheel via the switchover valve, the axle valve and the wheel valve can be automatically prevented, wherein the pressure limiting valve, the switchover valve, and the axle valve are combined in a central valve which can be preassembled.

7. A tire pressure regulating system for adjusting tire pressures of pneumatic tires fitted to vehicle wheels of a plurality of vehicle axles of a motor vehicle, said tire pressure regulating system comprising:

at least one electromagnetically switchable switchover valve by which a main connecting line leading to an axle valve of a vehicle axle is alternately connectable to a venting line which leads into a surrounding area or to a filling pressure line which is connected via a pressure limiting valve to a compressed air source, wherein the axle valve is an electromagnetically switchable axle valve associated with the vehicle axle by which an axle connecting line branching into first and second outer wheel connecting lines of the vehicle axle is alternately connectable to the main connecting line or shut off with respect to the main connecting line, a wheel valve arranged on a vehicle wheel by which an inner wheel connecting line leading into an interior of a pneumatic tire of the vehicle wheel is alternately connectable to the first outer wheel connecting line or shut off with respect to the first outer wheel connecting line, a two-channel rotary coupling arranged between the vehicle axle and the vehicle wheel, the two-channel rotary coupling having a working connection for transmitting compressed air between a vehicle chassis-side section and a wheel-side section of the outer wheel connecting line, the two-channel rotary coupling also having a control connection for transmitting control signals to the wheel valve between a vehicle chassis-side section and a wheel-side section of a wheel control line, and a valve arrangement by which a complete pressure drop in air pressure in the pneumatic tire of the vehicle wheel via the switchover valve, the axle valve and the wheel valve can be automatically prevented, wherein the valve arrangement comprises a pressure maintaining valve arranged in the axle connecting line by which air pressure in an axle-side section of the axle connecting line is automatically maintained at the predetermined minimum pressure, and wherein the pressure limiting valve, the switchover valve, the axle valve, and the pressure maintaining valve are combined in a central valve which can be preassembled.

8. The tire pressure regulating system as claimed in claim 1, wherein the pressure limiting valve, the at least one switchover valve, the axle valves, and the pressure maintaining valve are combined in a central valve which can be preassembled.

9. The tire pressure regulating system as claimed in claim 3, wherein the pressure limiting valve, the switchover valve, the axle valve, and the pilot control valve are combined in a central valve which can be preassembled.

10. The tire pressure regulating system as claimed in claim 5, wherein the pressure limiting valve, the switchover valve, the axle valve, and the overflow valve are combined in a central valve which can be preassembled.

11. A motor vehicle comprising the tire pressure regulating system as claimed in claim 1.

* * * * *